(12) United States Patent
Miao et al.

(10) Patent No.: US 11,006,033 B2
(45) Date of Patent: May 11, 2021

(54) SYSTEMS AND METHODS FOR MULTI-TARGET TRACKING AND AUTOFOCUSING BASED ON DEEP MACHINE LEARNING AND LASER RADAR

(71) Applicant: SZ DJI TECHNOLOGY CO., LTD., Shenzhen (CN)

(72) Inventors: Leilei Miao, Shenzhen (CN); Di Wu, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/962,344

(22) Filed: Apr. 25, 2018

(65) Prior Publication Data
US 2018/0352144 A1    Dec. 6, 2018

Related U.S. Application Data

(63) Continuation of application No. PCT/CN2017/086948, filed on Jun. 2, 2017.

(51) Int. Cl.
*H04N 5/232* (2006.01)
*G06K 9/62* (2006.01)
(Continued)

(52) U.S. Cl.
CPC ....... *H04N 5/23212* (2013.01); *B64C 39/024* (2013.01); *G01S 3/00* (2013.01); *G01S 15/66* (2013.01); *G01S 17/10* (2013.01); *G01S 17/66* (2013.01); *G06K 9/0063* (2013.01); *G06K 9/6256* (2013.01); *G06K 9/6268* (2013.01); *G06K 9/6271* (2013.01); *G06K 9/6293* (2013.01); *G06T 7/246* (2017.01);
(Continued)

(58) Field of Classification Search
None
See application file for complete search history.

(56) References Cited

U.S. PATENT DOCUMENTS

2010/0017046 A1* 1/2010 Cheung ............... G01S 7/003
                                                     701/2
2012/0019655 A1   1/2012 Fukamachi et al.
(Continued)

FOREIGN PATENT DOCUMENTS

CN    101790048 A    7/2010
CN    103731604 A    4/2014
(Continued)

OTHER PUBLICATIONS

International Search Report and Written Opinion dated Mar. 8, 2018 in corresponding PCT International Application No. PCT/CN2017/086948.
(Continued)

*Primary Examiner* — Mikhail Itskovich
(74) *Attorney, Agent, or Firm* — Finnegan, Henderson, Farabow, Garrett & Dunner, LLP

(57) ABSTRACT

Systems and methods for recognizing, tracking, and focusing a moving target are disclosed. In accordance with the disclosed embodiments, the systems and methods may recognize the moving target travelling relative to an imaging device; track the moving target; and determine a distance to the moving target from the imaging device.

20 Claims, 11 Drawing Sheets

(51) Int. Cl.

| | | |
|---|---|---|
| *G01S 17/66* | (2006.01) | |
| *G01S 15/66* | (2006.01) | |
| *B64C 39/02* | (2006.01) | |
| *G06T 7/521* | (2017.01) | |
| *G01S 3/00* | (2006.01) | |
| *G06K 9/00* | (2006.01) | |
| *G01S 17/10* | (2020.01) | |
| *G06T 7/246* | (2017.01) | |
| *G06T 7/73* | (2017.01) | |
| *G01S 15/08* | (2006.01) | |

(52) U.S. Cl.
CPC ............... *G06T 7/521* (2017.01); *G06T 7/73* (2017.01); *H04N 5/232* (2013.01); *H04N 5/232127* (2018.08); *B64C 2201/024* (2013.01); *B64C 2201/127* (2013.01); *G01S 15/08* (2013.01); *G06K 2209/21* (2013.01); *G06T 2207/10016* (2013.01); *G06T 2207/10028* (2013.01); *G06T 2207/20081* (2013.01); *G06T 2207/20084* (2013.01)

(56) References Cited

U.S. PATENT DOCUMENTS

| | | | |
|---|---|---|---|
| 2015/0156401 A1 | 6/2015 | Meyer | |
| 2016/0224703 A1* | 8/2016 | Shriver | ............... G06F 17/5009 |
| 2017/0205506 A1* | 7/2017 | Voorheis | ............... G01S 13/867 |

FOREIGN PATENT DOCUMENTS

| | | |
|---|---|---|
| CN | 104702839 A | 6/2015 |
| CN | 104766481 A | 7/2015 |
| CN | 104796672 A | 7/2015 |
| CN | 104811667 A | 7/2015 |
| CN | 204859351 U | 12/2015 |
| CN | 105391927 A | 3/2016 |
| CN | 105391939 A | 3/2016 |
| CN | 105518555 A | 4/2016 |
| CN | 105744163 A | 7/2016 |
| CN | 106249267 A | 12/2016 |
| CN | 106603914 A | 4/2017 |
| JP | 2004-40514 A | 2/2004 |
| JP | 2016-191979 A | 11/2016 |
| JP | 2017-76193 A | 4/2017 |
| WO | WO 2014/194345 A1 | 12/2014 |
| WO | WO 2017/066927 A1 | 4/2017 |

OTHER PUBLICATIONS

Maria, J., et al., "Stacked Autoencoders Using Low-Power Accelerated Architectures for Object Recognition in Autonomous Systems," Neural Process Letters, Kluwer Academic Publishers, Norwell, MA, US, vol. 43, No. 2, May 12, 2015, 445-458, XP035925714, ISSN: 1370-4621, DOI: 10. 1007/S11063-015-9430-9 [retrieved on May 12, 2015] *the whole document*.

* cited by examiner

SYSTEMS AND METHODS FOR MULTI-TARGET TRACKING AND AUTOFOCUSING BASED ON DEEP MACHINE LEARNING AND LASER RADAR

CROSS-REFERENCE TO RELATED PATENT APPLICATIONS

This application is a continuation of International Application No. PCT/CN2017/086948, filed Jun. 2, 2017, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to imaging technology and, more particularly, to methods and systems for multi-target tracking and autofocusing based on deep machine learning and laser radar.

BACKGROUND

Movable objects, such as unmanned aerial vehicles ("UAV") (sometimes referred to as "drones"), include pilotless aircraft of various sizes and configurations that can be remotely operated by a user and/or programmed for automated flight. UAVs may be equipped with imaging devices to capture footage from stationary and/or moving perspectives that may be otherwise too challenging for personnel to capture. Additionally, UAVs may be equipped to collect imaging data over a certain period of time or for the duration of travel from one location to another. In these circumstances, the UAV may be controlled in conjunction with information gathered using optical or sensory equipment to recognize, follow ("track"), and focus on target objects ("targets"), such as people, vehicles, moving objects, stationary objects, etc. to achieve high-quality desirable images.

SUMMARY

The methods and systems for multi-target tracking and focusing based on deep machine learning and laser radar in the embodiments disclosed herein overcome disadvantages of conventional systems.

In one aspect, the present disclosure relates to a method for recognizing, tracking and focusing a moving target. The method includes recognizing the moving target travelling relative to an imaging device; tracking the moving target; and determining a distance to the moving target from the imaging device.

In another aspect, the present disclosure relates to a system for recognizing, tracking and focusing a moving target. The system includes a controller having one or more processors. The controller may be configured to: recognize the moving target travelling relative to an imaging device; track the moving target; and determine a distance to the moving target from the imaging device.

In yet another aspect, the present disclosure relates to an unmanned aerial vehicle (UAV) system. The UAV system may include a controller in communication with multiple devices. The controller may be configured to: recognize the moving target travelling relative to an imaging device; track the moving target; and determine a distance to the moving target from the imaging device.

In yet another aspect, the present disclosure relates to a non-transitory computer-readable medium storing instructions that, when executed, cause a computer to perform a method of recognizing, tracking and focusing a moving target. The method includes recognizing the moving target travelling relative to an imaging device; tracking the moving target; and determining a distance to the moving target from the imaging device.

DETAILED DESCRIPTION

Figure 1:
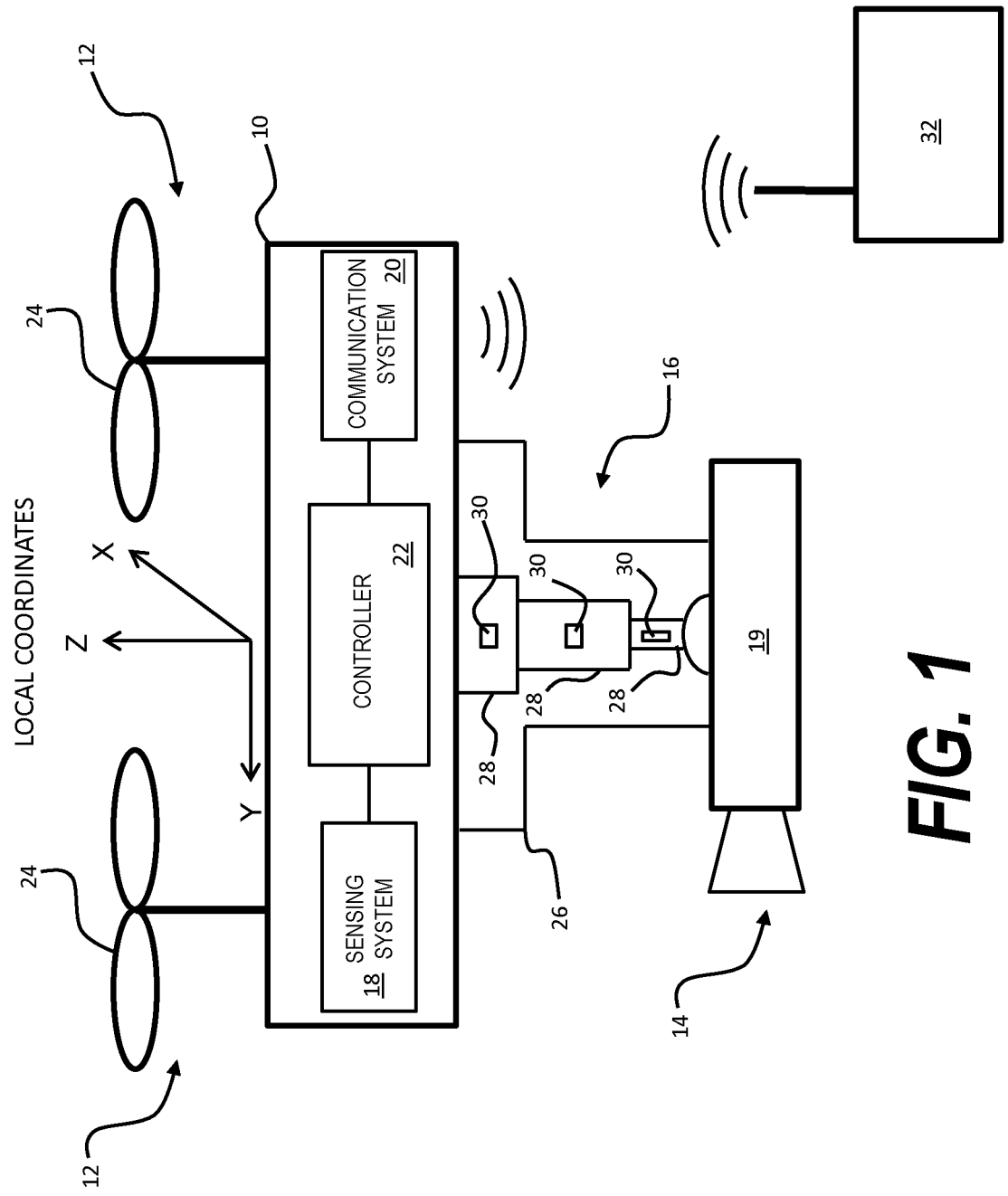
FIG. 1 is a schematic diagram of an exemplary movable object with a carrier and a payload and a control terminal consistent with embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

There are previous approaches for identifying, tracking, and focusing on moving objects/targets. For example, a camshift algorithm realizes portrait recognition and tracking using infrared imaging. It selects a focus window based on template matching and can solve problems associated with auto-focusing when using infrared to image moving objects. While the camshift algorithm is suitable for tracking targets in simple cases, it fails to track objects in more complex situations. Automatic focusing ("auto-focus") and tracking of objects can be realized by detecting natural features of the objects such as corners, lines, or edges. Further, feature point matching based on the Kanade-Lucas-Tomasi algorithm may be used to estimate camera motion vectors, and a spatial location invariant criterion may be used to check matching points and delete those points which were error-matched effectively. Although these previous approaches can effectively track moving objects, in complex scenes, tracking accuracy is not high, and the calculation process is more complex. Further, in an auto-focus process, the movement of a target may change the scene within a focus window, such that a portion of the background may change in the focus window, causing the focus to fail or become unstable.

The disclosed embodiments of the present disclosure provide methods and systems for multi-target tracking and focusing based on deep machine learning and laser radar. The disclosed methods and systems may be based on digital image processing for tracking and focusing technology, and may be applied to various types of images and imaging systems, such as camera, video recording, etc. Digital image processing based on deep machine learning can effectively recognize multiple targets and accurately track the targets. By further combining accurate distance measurement obtained by laser radar for only the recognized targets rather than the entire scene, costs associated with devices can be reduced and multi-target tracking and focusing can be achieved. Accordingly, conventional problems associated with tracking and focusing on a moving target, such as a low target recognition rate, tracking instability, and focus instability or focus failure, may be solved. As used in the disclosed embodiments, a "target" is an object being tracked, and a "moving target" is an object being tracked that is moving relative to an imaging system used for tracking, such that at least one of the imaging system and target object is moving relative to the other.

Generally, laser radar distance measurement refers to a process for measuring a distance to a target by illuminating that target with a pulsed laser light, and measuring the reflected pulses with a sensor, such as using a light detection and ranging (LiDAR) technique. For example, an infrared laser device may send a laser pulse in a narrow beam towards an object, and a period of time taken by the pulse to be reflected off the object and returned to the sender of the laser pulse is determined. A distance from the object to the laser device can be calculated based on the measured time elapsed between when the pulse was transmitted and when its reflected pulse was received and the speed of light. Although the disclosed embodiments of the present disclosure are described using such a laser radar distance measurement, other suitable distance measurement techniques, such as ultrasonic distance measurement may also be employed.

Deep machine learning may refer to a class of machine learning algorithms that may use interconnected "layers" of linear and/or nonlinear processing devices or software, e.g., configured to perform image feature extraction and/or transformation, in which each successive layer uses an output from a previous layer as its input. Deep machine learning may be supervised (e.g., classification) or unsupervised (e.g., pattern analysis), and higher level features may be derived from lower level features to form a hierarchical representation of data (e.g., pixels of an image). An observation (e.g., an image, audio data, etc.) that is processed by deep machine learning may be represented in many ways; for example, a vector of intensity values per pixel, a set of edges, regions of a particular shape, sampled signals, spectral frequencies, etc. Deep machine learning architectures may include deep neural networks, convolutional deep neural networks, deep belief networks, recurrent neural networks, and so forth.

A neural network is a computational model or system based on a collection of individual neural units (i.e., neurons). The collection of neural units may be organized into different layers of neural units, for example, an input layer, one or more hidden layers, and an output layer. Each neural unit may be connected with many other neural units of different layers, and be computed using an activation function (e.g., a summation function). Observations (e.g., image data or patterns) may be presented to the neural network via the input layer, which communicates information corresponding to the observation to the one or more hidden layers where the actual processing may be done using an activation function and a model of weighted connections. The hidden layers may link to the output layer, which in turn may provide an output determined from processing the observation. In some embodiments, a neural network may be self-learning and trained by examples. For example, learning rules may be applied to neural networks to modify one or more weights (e.g., scalar parameters) of the connections according to the input observation.

In the disclosed embodiments, a suitable neural network is selected, and the characteristics of corresponding layers in the network are understood. The neural network is preferably trained, e.g., using a large number of samples collected in different environments. The weights obtained from training may be used to recognize targets in the image data that is input to the neural network. Further, by testing the neural network using image of objects in different environments and the weight parameters determined from training the network, a tracking algorithm may be used to track one or more target objects in the image data. In some embodiments, one or more distance measurements by laser radar may be used to measure a distance from an imaging device to only certain target objects that are of interest to a user. Automatic focusing by the imaging device on a desired target object may be achieved by automatically adjusting focus length of the imaging device based on the measured distance.

By focusing only on a target object of interest, for example selecting a fixed focus window containing the desired target object, the time and computation cost associated with tracking and focusing on the target object can be significantly reduced, and interference resulting from background information can be significantly decreased, enabling real-time target tracking and flexible selection of focus on only one or more desired target objects.

Although the following exemplary embodiments are described in the context of a movable object, such as a UAV, those skilled in the art will appreciate other implementations are possible and alternative embodiments may be deployed without using a UAV. For example, the system and method disclosed herein may be implemented using various imaging systems, for example on moving or stationary objects, or as part of a larger system consistent with the disclosed embodiments.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be a UAV. Although movable object 10 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more propulsion devices 12 and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a sensing system 18, a communication system 20, and a controller 22 in communication with the other components.

Movable object 10 may include one or more (e.g., 1, 2, 3, 3, 4, 5, 10, 15, 20, etc.) propulsion devices 12 positioned at various locations (for example, top, sides, front, rear, and/or bottom of movable object 10) for propelling and steering movable object 10. Propulsion devices 12 may be devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. Each propulsion device 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 may be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steering of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes.

Payload 14 may include one or more sensory devices 19. Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gather data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices for capturing audio data, such as microphones or ultrasound detectors. Sensory devices 19 may also or alternatively include other suitable sensors for capturing visual, audio, and/or electromagnetic signals. The imaging devices may be capable of performing auto focus on a target by adjusting focus length to image the target with a desirable image quality. The sensory devices 19 may include one or more distance measurement devices that measure distances from the imaging devices to targets. The distance measurement devices may implement a laser radar device, an ultrasonic device, and/or a combination thereof.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15°, etc.), about one or more of its axes.

Carrier 16 may include a frame assembly 26, one or more actuator members 28, and one or more carrier sensors 30. Frame assembly 26 may be configured to couple the payload 14 to the movable object 10 and, in some embodiments, allow payload 14 to move with respect to movable object 10. In some embodiments, frame assembly 26 may include one or more sub-frames or components movable with respect to each other. Actuation members 28 may be configured to drive components of frame assembly relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or include suitable actuators and/or force transmission components. For example, actuator members 28 may include electric motors configured to provide linear or rotation motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14 with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or movable object 10. Carrier sensors 30 may be configured to communicate data and information with controller 22 via a wired or wireless connection (e.g., RFID, Bluetooth, Wi-Fi, radio, cellular, etc.). Data and information generated by carrier sensors 30 and communicated to controller 22 may be used by controller 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system may include sensors for determining positional information, velocity information, and acceleration information relating to movable object 10 and/or targets. In some embodiments, sensing system may also include carrier sensors 30. Components of sensing system 18 may be configured to generate data and information that may be used (e.g., processed by controller 22 or another device) to determine additional information about movable object 10, its components, or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, etc.), motion sensors, inertial sensors (e.g., IMU sensors), proximity sensors, image sensors, etc. Sensing system 18 may also include sensors or be configured to provide data or information relating to the surrounding environment, such as weather information (e.g., temperature, pressure, humidity, etc.), lighting conditions (e.g., light-source frequencies), air constituents, or nearby obstacles (e.g., objects, structures, people, other vehicles, etc.).

Sensing system 18 may include one or more light emitters and sensors for performing a laser radar distance measurement, such as for making a LiDAR measurement to determine a distance from the movable object to a target object. In some embodiments, a LiDAR laser and corresponding sensor may be mounted anywhere on the movable object 10, or may be attached to the movable object as a separate module, such as on carrier 16, or included in any other device or sensor on the movable object.

Communication system 20 may be configured to enable communications of data, information, commands, and/or other types of signals between controller 22 and off-board entities. Communication system 20 may include one or more components configured to send and/or receive signals, such as receivers, transmitter, or transceivers that are configured to carry out one- or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications between devices for providing input for controlling movable object 10 during flight, such as a control terminal ("terminal") 32.

Terminal 32 may be configured to receive input, such as input from a user (i.e., user input), and communicate signals indicative of the input to controller 22. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as operational data relating to, for example, positional data, velocity data, acceleration data, sensory data, and other data and information relating to movable object 10, its components, and/or its surrounding environment. Terminal 32 may be a remote control with physical sticks configured to control flight parameters, or may be a touch screen device, such as a smartphone or a tablet, with virtual controls for the same purposes, and may employ an application on a smartphone or a tablet, or a combination thereof.

In some embodiments, terminal 32 may be a smart eyeglass. As used herein, the smart eyeglass may include any wearable computer glasses or other wearable item that can provide additional information to an image or scene that a wearer sees. The smart eyeglass may include an optical head-mounted display (OHMD) or embedded wireless glasses with transparent heads-up display (HUD) or augmented reality (AR) overlay that has the capability of reflecting projected digital images as well as allowing the user to see through it, or see better with it. The smart eyeglass may serve as a front end display for images, videos, and other data or information received from the movable object 10, for example, via cellular technology or Wi-Fi. In some embodiments, the smart eyeglass may also control the movable object 10 via natural language voice commands and/or use of touch buttons on the smart eyeglass.

Figure 2B:
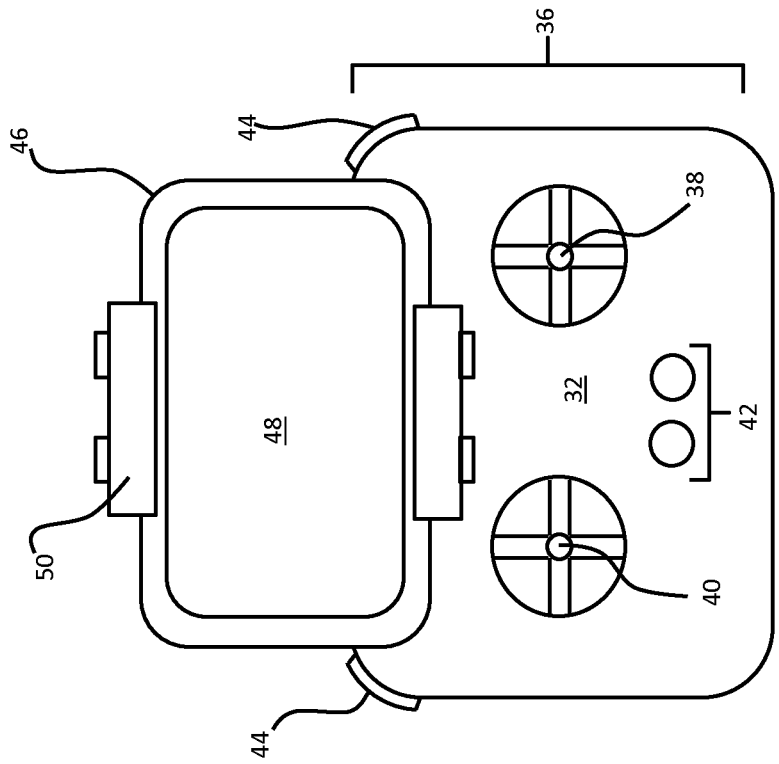
FIGS. 2A and 2B are schematic diagrams of exemplary control terminals that may be used with embodiments consistent with the present disclosure.
Figure 2A:
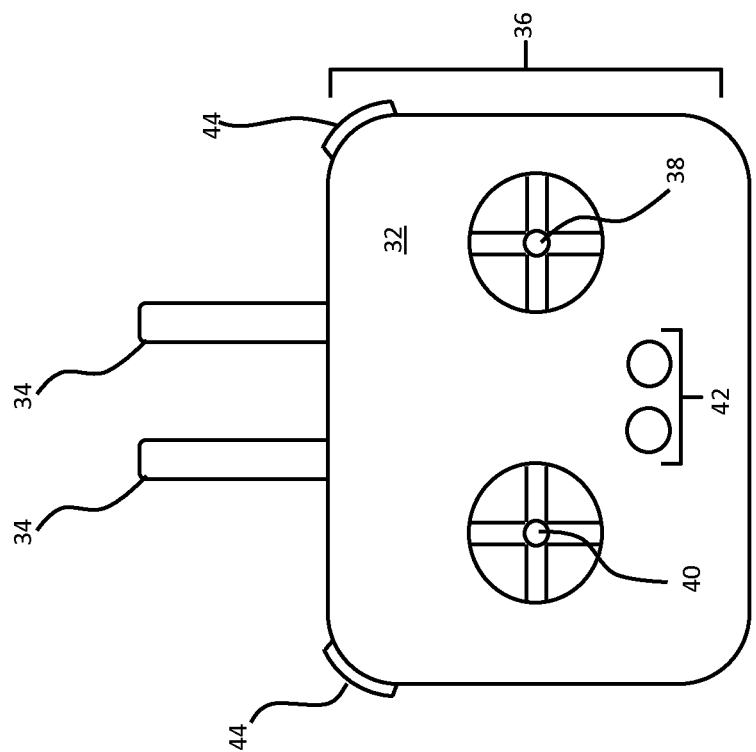

In the example shown in FIGS. 2A and 2B, terminal 32 may include communication devices 34 that facilitate communication of information between terminal 32 and other entities, such as movable object 10 or another terminal 32. Communication devices 34 may include antennae or other devices configured to send or receive signals. Terminal 32 may also include one or more input devices 36 configured to receive input from a user for communication to movable object 10. FIG. 2A shows one exemplary embodiment of terminal 32 having an input device 36 with a plurality of input devices 38, 40, 42, and 44 configured to receive user inputs indicative of desired movements of movable object 10 or its components. It is understood, however, that other possible embodiments or layouts of terminal may be possible and are within the scope of this disclosure.

Terminal 32 may include input devices, such as input levers 38 and 40, buttons 42, triggers 44, and/or other types of input devices for receiving one or more inputs from the user. Each input device of terminal 32 may be configured to generate an input signal communicable to controller 22 and usable by controller 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, a voice recognition device, and/or other types of input devices.

As shown in FIG. 2B, terminal 32 may also include a display device 46 configured to display and/or receive information to and/or from a user. For example, terminal 32 may be configured to receive signals from movable object 10, which signals may be indicative of information or data relating to movements of movable object 10 and/or data (e.g., imaging data) captured using movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may be a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and include graphical features, such as interactive graphical features (e.g., graphical buttons, text boxes, dropdown menus, interactive images, etc.). For example, in one embodiment, terminal 32 may include graphical representations of input levers 38 and 40, buttons 42, and triggers 44, which may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, display device 46 may be an integral component of terminal 32. That is, display device 46 may be attached or fixed to terminal 32. In other embodiments, display device may be connectable to (and disconnectable from) terminal 32. That is, terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes to be used. For example, terminal 32 may be configured to communicate with electronic devices having a memory and at least one processor, which control devices may then be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to controller 22 (e.g., via communication system 20).

It is noted that other control conventions that relate inputs received via terminal 32 to desired or actual movements of movable device 10 may be used, if desired.

Figure 3:
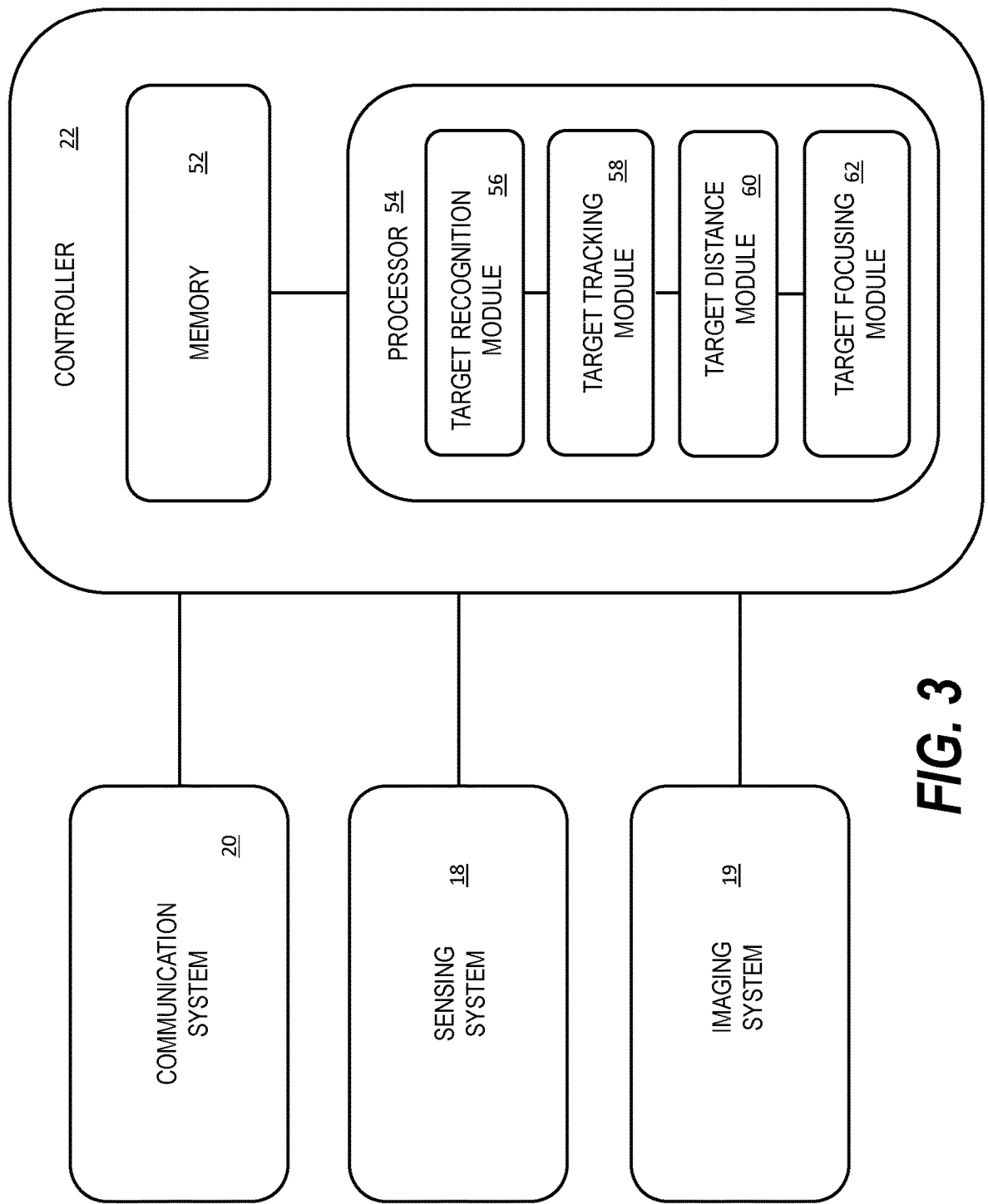
FIG. 3 is a schematic diagram of an exemplary controller that may be used with embodiments of the present disclosure.

As shown in FIG. 3, controller 22 may include one or more components, for example, a memory 52 and at least one processor 54. Memory 52 may be or include at least one non-transitory computer readable medium and can include one or more memory units of non-transitory computer-readable medium. Non-transitory computer-readable medium of memory 52 may be or include any type of volatile or non-volatile memory device, for example including floppy disks, optical discs, DVD, CD-ROMs, micro-drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from sensing system 18 may be communicated to and stored in non-transitory computer-readable medium of memory 52. The computer-readable medium associated with memory 52 may also be configured to store logic, code and/or program instructions executable by processor 54 to perform any suitable embodiment of the methods described herein. For example, the computer-readable medium associated with memory 52 may be configured to store computer-readable instructions that, when executed by processor 54, cause the processor to perform a method comprising one or more steps. The method performed by the processor based on the instructions stored in the non-transitory computer readable medium may involve processing inputs, such as inputs of data or information stored in the non-transitory computer-readable medium of memory 52, inputs received from terminal 32, inputs received from sensing system 18 (e.g., received directly from sensing system or retrieved from memory), and/or other inputs received via communication system 20. The non-transitory computer-readable medium may be configured to store sensing data from the sensing module to be processed by the processing unit. In some embodiments, the non-transitory computer-readable medium can be used to store the processing results produced by the processing unit.

The sensory device 19 in FIG. 1 may be embodied by the imaging system 19 in the exemplary embodiment of FIG. 3. In this disclosed embodiment, imaging system 19 may include imaging devices configured to gather data that may be used to generate images for surveying, tracking, and capturing images or video of targets (e.g., objects, landscapes, subjects of photo or video shoots, etc.). For example, imaging devices may include photographic cameras, video cameras, infrared imaging devices, ultraviolet imaging devices, x-ray devices, ultrasonic imaging devices, radar devices, etc. In this exemplary embodiment, the imaging device may be configured to generate optical data of the target for identifying and tracking the target. For example, the imaging device may be an optical device, such as a camera or video camera. The imaging device may be configured to generate imaging data indicative of one or more features of the target. The imaging system 19 may further be configured to communicate data (e.g., image frames) and information with controller 22 via a wired or wireless connection (e.g., RFID, Bluetooth, Wi-Fi, radio, cellular, etc.). Data and information generated by imaging system 19 and communicated to controller 22 may be used by controller 22 for further processing.

Processor 54 may include one or more processors and may embody a programmable processor, e.g., a central processing unit (CPU). Processor 54 may be operatively coupled to memory 52 or another memory device configured to store programs or instructions executable by processor 54 for performing one or more method steps. It is noted that method steps described herein may be stored in memory 52 and configured to be carried out by processor 54 to cause the method steps to be carried out by the processor 54.

In some embodiments, processor 54 may include and/or alternatively be operatively coupled to one or more control modules, such as a target recognition module 56, a target tracking module 58, a target distance module 60, and a target focusing module 62, which will be explained in greater detail below. The target recognition module 56, the target tracking module 58, the target distance module 60, and the target focusing module 62 may be implemented in software for execution on processor 54, or may be implemented in hardware and/or software components separate from processor 54 (not shown in the figure).

The target recognition module 56 may be configured to recognize one or more targets that appear in images or videos captured by the imaging system 19. The target recognition module may be implemented by any suitable techniques that include, but are not limited to, deep machine learning. For example, in the example of deep machine learning, complete images or video frames as the input are received by a neural network, and the neural network may divided the complete image or video frame into different regions. The neural network may further predict bounding boxes of each region, and the probability of a target appearing in a region. A deep machine learning algorithm used herein may be any suitable deep machine learning algorithm may include commercially available deep machine learning software packages, for example, YOLO (You Only Look Once) real-time target detection system.

For example, the neural network of YOLO (version 2) includes 32 layers in which 22 layers are convolution layers, which can efficiently identify targets and detect the target region containing a target object. This neural network may be used to accurately track the target in accordance with the disclosed embodiments.

Figure 4A:
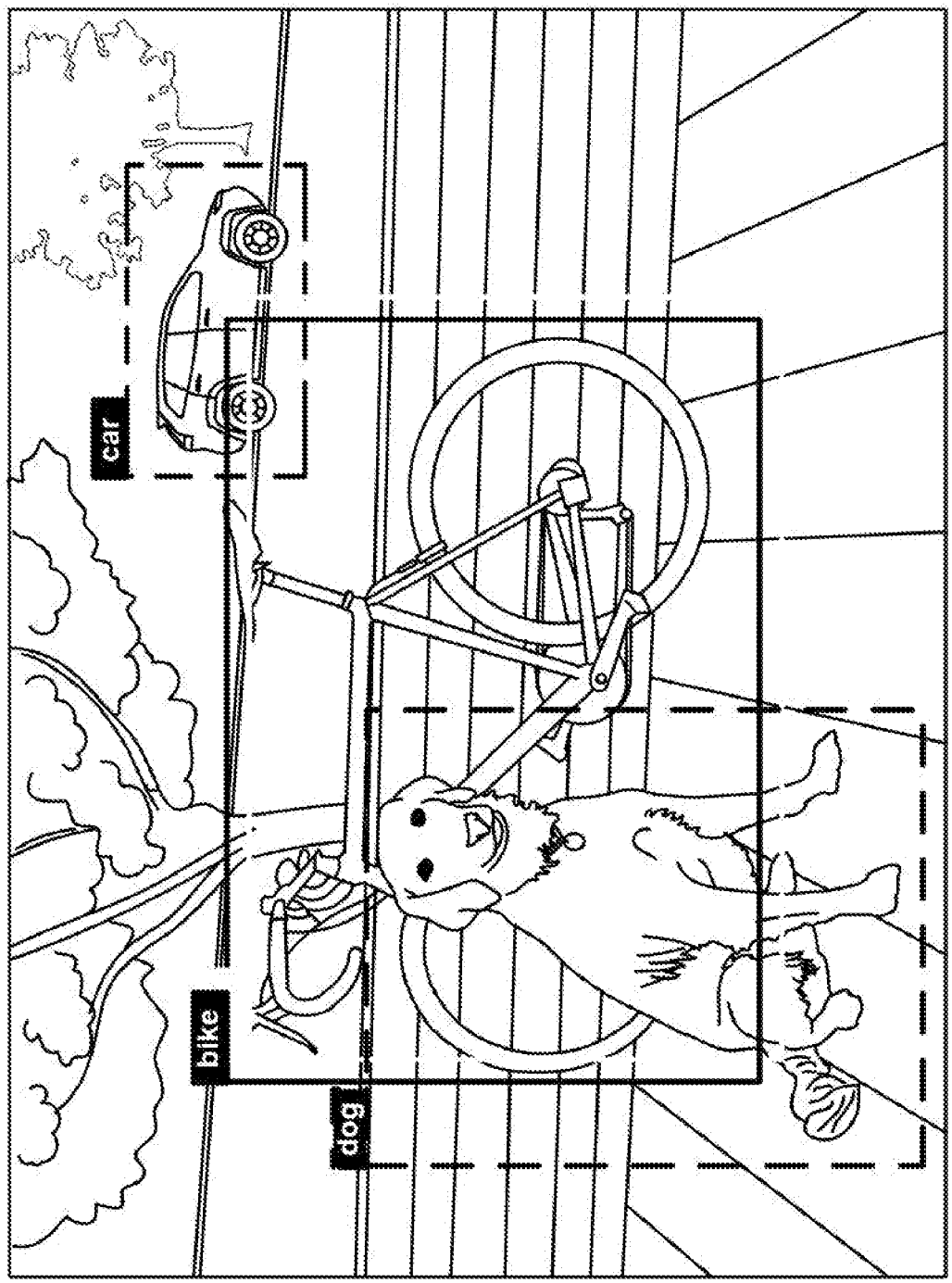
FIG. 4A is a schematic diagram in which multiple targets are recognized by a neural network of deep machine learning consistent with embodiments of the present disclosure.

In some embodiments, off-line training a neural network of deep machine learning may be performed. For example, a variety of training samples may be prepared and labeled. The training samples may include a large number of samples captured in different environments, circumstances, and scenes. The labeled training samples may be input to a neural network for off-line training to learn a large number of object features, such that multiple targets can be accurately recognized in a real-time manner by the UAV. The weights after training may be tested. After multiple iterations, an operative set of weight parameters may be obtained based on the input training samples. FIG. 4A shows a schematic diagram in which multiple objects (e.g., dog, car, bike) and their corresponding regions (bounding boxes) in an image may be identified using a neural network. One or more of these identified objects then may be designated as target objects for tracking.

Figure 4B:
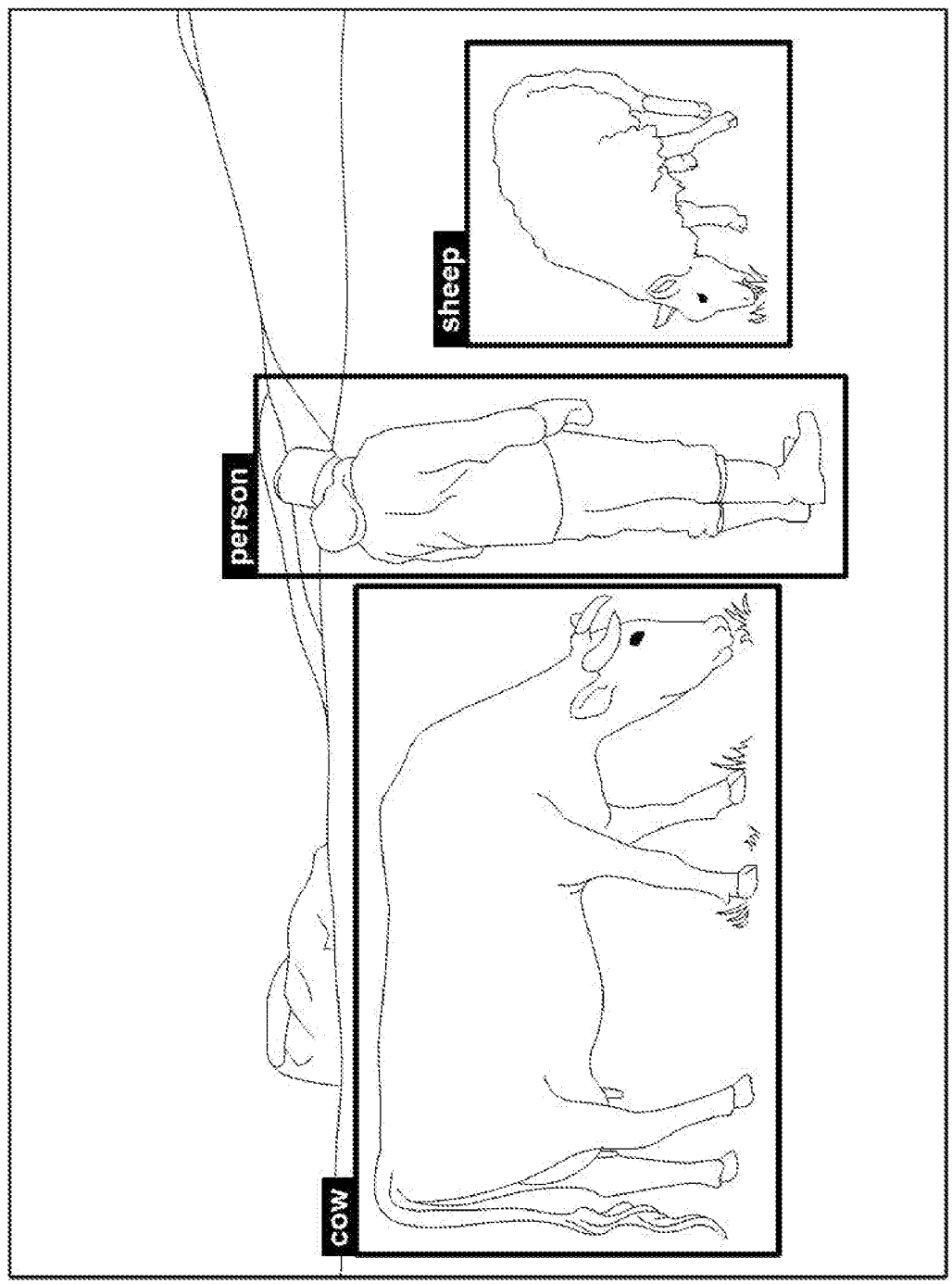
FIG. 4B is a schematic diagram in which multiple targets are recognized by a neural network of deep machine learning for improving frame rate consistent with embodiments of the present disclosure.

In some embodiments, a different neural network may be employed to improve the image frame rate processing. For example, Tiny YOLO neural networks may be utilized, which include 17 layers, including 8 convolution layers. FIG. 4B shows a schematic diagram in which multiple target objects (e.g., cow, person, sheep) and their corresponding regions (bounding boxes) in an image may be identified using a neural network configured to improve image frame rate processing.

The target tracking module 58 may be configured to track one or more targets that are already accurately recognized by the target recognition module 56. Once the one or more targets are recognized, the target tracking module 58 may use a target tracking algorithm to track the targets. Such tracking algorithm may help control propulsion devices 12 of movable object 10 to adjust the spatial disposition, velocity, and/or acceleration of the movable object 10 with respect to six degrees of freedom (e.g., three translational directions along its coordinate axes and three rotational directions about its coordinate axes) to enable movable object 10 to automatically track a desired target object.

Figure 5:
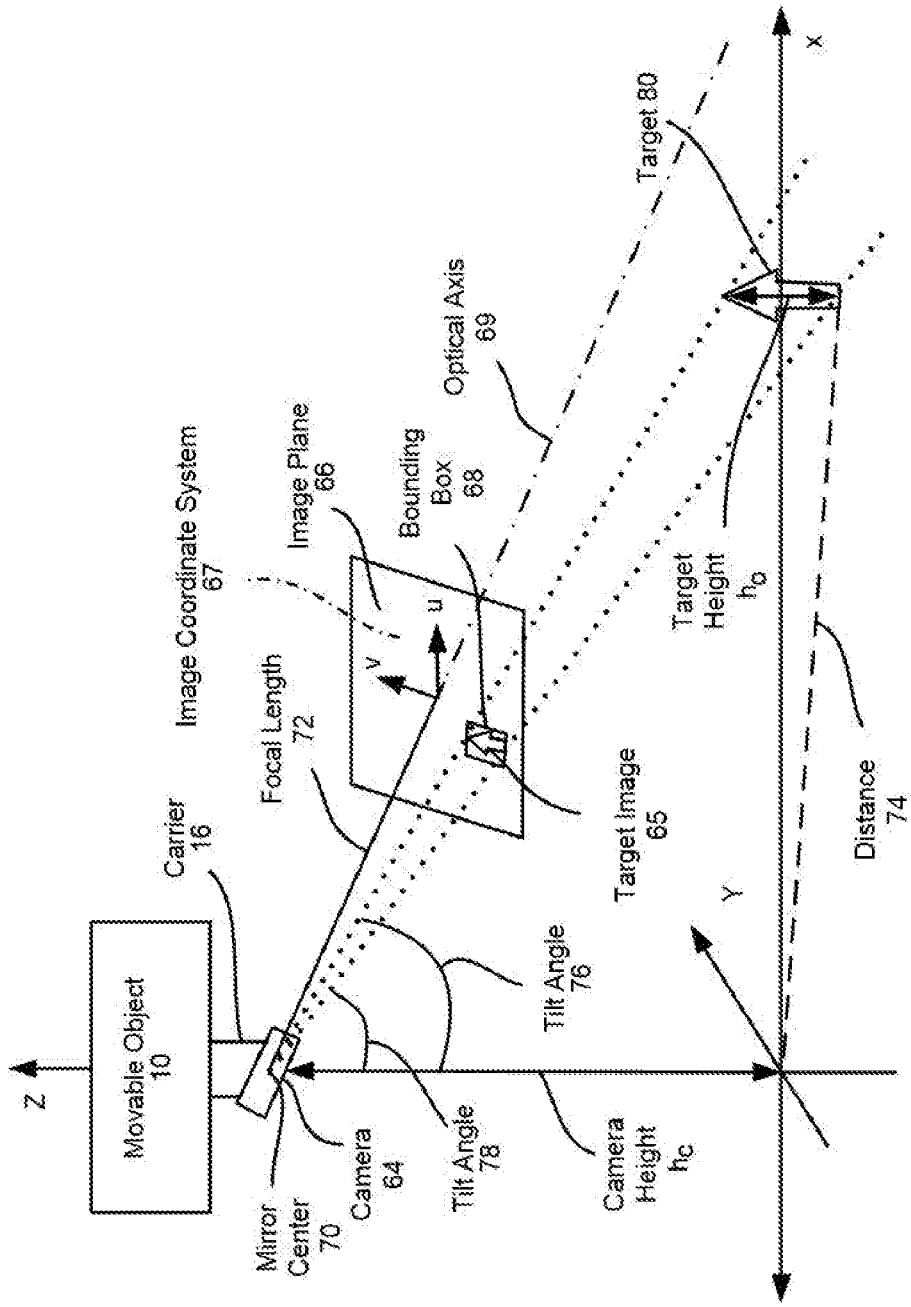
FIG. 5 is a schematic diagram of an exemplary target tracking technique consistent with embodiments of the present disclosure.

With reference to FIG. 5, target tracking may be performed in conjunction with a sensory device (i.e., sensory device 19 in FIG. 1 and imaging system 19 in FIG. 3), such as a camera 64, connected to movable object 10. Camera 64 may be configured to capture an image containing a target object (e.g. the dog in FIG. 4A or the sheep in FIG. 4B), on an image plane 66 in an image coordinate system 67. A target image 65 of the target object may be formed in the image plane 66, and a bounding box 68 may be generated around the target image 65.

Target image 65 may be represented based on an aperture imaging model, which assumes that a light ray from an object point in a three dimensional space can be projected onto a two-dimensional image plane to form an image point. Camera 64 may include an optical axis 69, e.g., measured from a center 70 of the camera, and a focal length 72. When optical axis 69 passes through both the camera center 70 and the center of image plane 66, the distance between the camera center 70 and the center of image plane 66 can be equal or substantially the same distance as the camera's focal length 72.

The projected relative distance 74 on the ground between camera center 70 and the target 80 (e.g., the distance from camera 64 and the target object) can then be determined based on geometric relationships and coordinate transformations. For example, the target 80 may have a top target point $(x_t, y_t, z_t)$ and a bottom target point $(x_b, y_b, z_b)$ in a world coordinate system, which may be projected on image plane 66 as a top image point $(u_t, v_t)$ and a bottom image point $(u_b, v_b)$ respectively. A top line passes through camera center 70 and the top image point at a first tilt angle 76 with respect to the Z axis of the world coordinate system. Also, a bottom line passes through the camera center 70 and the bottom image point at a second tilt angle 78 from the Z axis.

Direction vectors $\vec{T}$ and $\vec{B}$ representing the top and bottom lines from camera 64 to the top and bottom of the target image 65 can be expressed as the following $$\vec{T} = \begin{pmatrix} x_t \\ y_t \\ z_t \end{pmatrix} \sim RK^{-1} \begin{pmatrix} u_t \\ v_t \\ 1 \end{pmatrix}$$

$$\vec{B} = \begin{pmatrix} x_b \\ y_b \\ z_b \end{pmatrix} \sim RK^{-1} \begin{pmatrix} u_b \\ v_b \\ 1 \end{pmatrix}$$

where K represents the intrinsic matrix of the camera, and R represents the camera rotation.

The distance 74 to the target can then be determined based on the height of the camera $h_c$ and position of the bounding box 68 in the image coordinate system 67. For example, the distance 74 to the target object 80 can be calculated as $d=-h_c/z_b*P_b$, and the target height can be calculated as $h_o=h_c+z_t d/P_t$, where $h_c$ is the measured or effective height of the camera, $P_b$ is the projection length of $\vec{B}$ on the ground, and $P_t$ is the projection length of $\vec{T}$ on the ground, which are defined as in the following.

$$P_b = \sqrt{x_b^2 + y_b^2}$$

$$P_t = \sqrt{x_t^2 + y_t^2}$$

Thereafter, the system can estimate the linear distance 74 (e.g., along the X-axis) to the target, even when the target altitude changes (e.g. when the target traverses rough terrain, inclines, stairs, climbs objects, hovers or flies at varying altitudes, etc.). The projected relative distance 74 on the ground between the target object 80 and the movable object 10 can be calculated as $h_c/dh$, where dh present the estimate height of the target at a unit distance away from the camera, which can be computed using the following formula.

$$dh = \left\| \frac{\vec{T}}{P_t} - \frac{\vec{B}}{P_b} \right\|$$

In accordance with some embodiments, to provide target tracking, controller 22 may be configured to automatically, by the target tracking module 60, control propulsion device 12 in order to maintain a constant distance 74 at desired or default values during flight. For example, the target tracking module 60 may be configured to continually or periodically calculate the distance 74 and use feedback control (e.g., PID control) to maintain the distance 74 at a desired value (e.g., input by the user via terminal 32) or a default value. Target tracking may be conducted even when the height of movable object 10 changes, such as when movable object traverses rough terrain, slopes, other objects, etc., while tracking a target.

In some embodiments, tracking can be performed even if the imaging system 19 is in the process of capturing one or more images. The one or more images may have a focus on a first target in the images, while tracking can be performed on several other targets, e.g. each surrounded with a respective bounding box. In such embodiments, when focus is switched from being on the first target to a second target that is one of the several other targets (e.g., another target in the one or more images), the system can perform a refocusing operation based on a distance measured to the second target. Further to these disclosed embodiments, measuring the distance to the second target can be determined by scanning a region in the bounding box surrounding the second target instead of scanning the whole region of the image. Thus, the system in these embodiments may have a further advantage in terms of reducing processing time and cost.

Also, in some embodiments, tracking may be performed only for a target of interest, e.g., to reduce costs and increase the frame rate. In such a scenario, the target of interest may be identified via a neural network of deep machine learning which recognizes the target of interest to be within a certain region of an image, for example, recognizing the dog within a bounding box in FIG. 4A. In such embodiments, the system may reduce computational costs for tracking, focusing on, and imaging the target of interest. Further to these embodiments, when the target of interest is switched, for example, from a first target (e.g., the dog in FIG. 4A) to a second target (e.g., the car in FIG. 4A), tracking of the second target (e.g., the car) can be performed fast and efficiently due to the close proximity of the second target to the first target, thereby not only reducing computational costs associated with tracking, focusing on, and imaging the second target, but also increasing the frame rate of imaging targets.

In some embodiments, tracking may involve the movement of the UAV or may be performed from a stationary object.

The target distance module 60 may be configured to determine a distance to a target object from the imaging system 19, for example. After a target is identified, recognized, and tracked, accurate focus is employed to acquire a high quality image of the target. Due to the relative movement between the target object and the movable object 10, the distance to the target object from the imaging system 19 may change constantly. To get an accurate focus on the target, the distance to the target needs to be measured in a real-time manner.

Figure 6A:
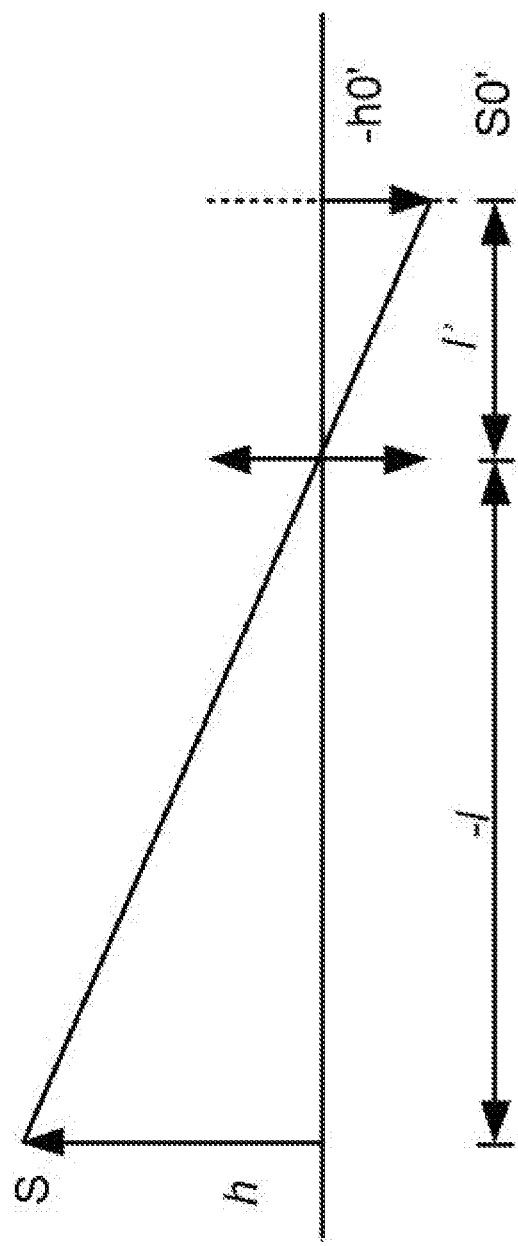
FIG. 6A is a schematic diagram showing an exemplary image that may be formed using a target consistent with embodiments the present disclosure.
Figure 6B:
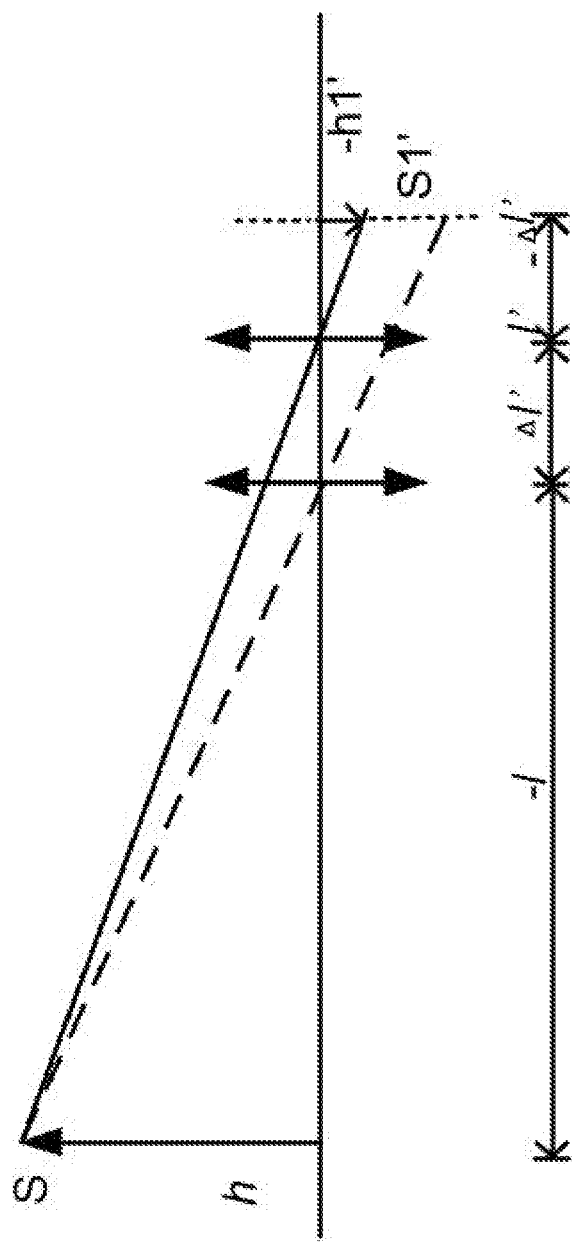
FIG. 6B is a schematic diagram showing an exemplary image of the target of FIG. 6A after movement of the target consistent with embodiments of the present disclosure.

FIG. 6A shows a schematic diagram of an exemplary embodiment for forming an image of a target object prior to moving relative to the target object. As shown in FIG. 6A, an image $S_0'$ of the target S is formed on an imaging plane. The distance from the target object and the image to the image plane are $-l$ and $l'$ respectively. The height of the image $S_0'$ is $-h_0'$ as defined in equation (1):

$$-h_0' = \frac{l'}{-l} \times h \quad (1)$$

where $$\frac{l'}{-l}$$

is an image magnification. When the target object moves, as shown in FIG. 6B, the object distance and the image distance are changed to $-l+\Delta l'$ and $L'-\Delta l'$ respectively. The height of an image $S_1'$ of the target S is changed to $-h_1'$ as defined in equation (2):

$$-h_1' = \frac{l'-\Delta l'}{-l+\Delta l'} \times h \qquad (2)$$

where $$\frac{l'-\Delta l'}{-l+\Delta l'}$$

is an image magnification after moving of the target. It can be seen due to the movement of the target, the target image has changed.

By combining equations (1) and (2), equation (3) can be determined as:

$$-h_1' = \frac{l'-\Delta l'}{-l+\Delta l'} \times \frac{-l}{l'} \times (-h_0') \qquad (3)$$

Thus, an offset of image height can be expressed in equation (4) as:

$$|-h_0' - (-h_1')| = \left|1 - \frac{l'-\Delta l'}{l'} \times \frac{-l}{-l+\Delta l'}\right| \times (-h_0') \qquad (4)$$

From the equation (4), it can be see that, for targets having the same initial image heights and angles of view, the greater the target object distance, the smaller the image height offset. However, even when a target object distance is infinity, an image height offset is still present as shown in equation (5):

$$\lim_{l \to \infty} |-h_0' - (-h_1')| = \left|\frac{\Delta l'}{l'}\right| \times (h_0'). \qquad (5)$$

Accordingly, when the target moves, the target object distance must be accurately measured, and accurate focus may be achieved by driving a focus control mechanism in the imaging system 19 based on the measured object distance.

Figure 7A:
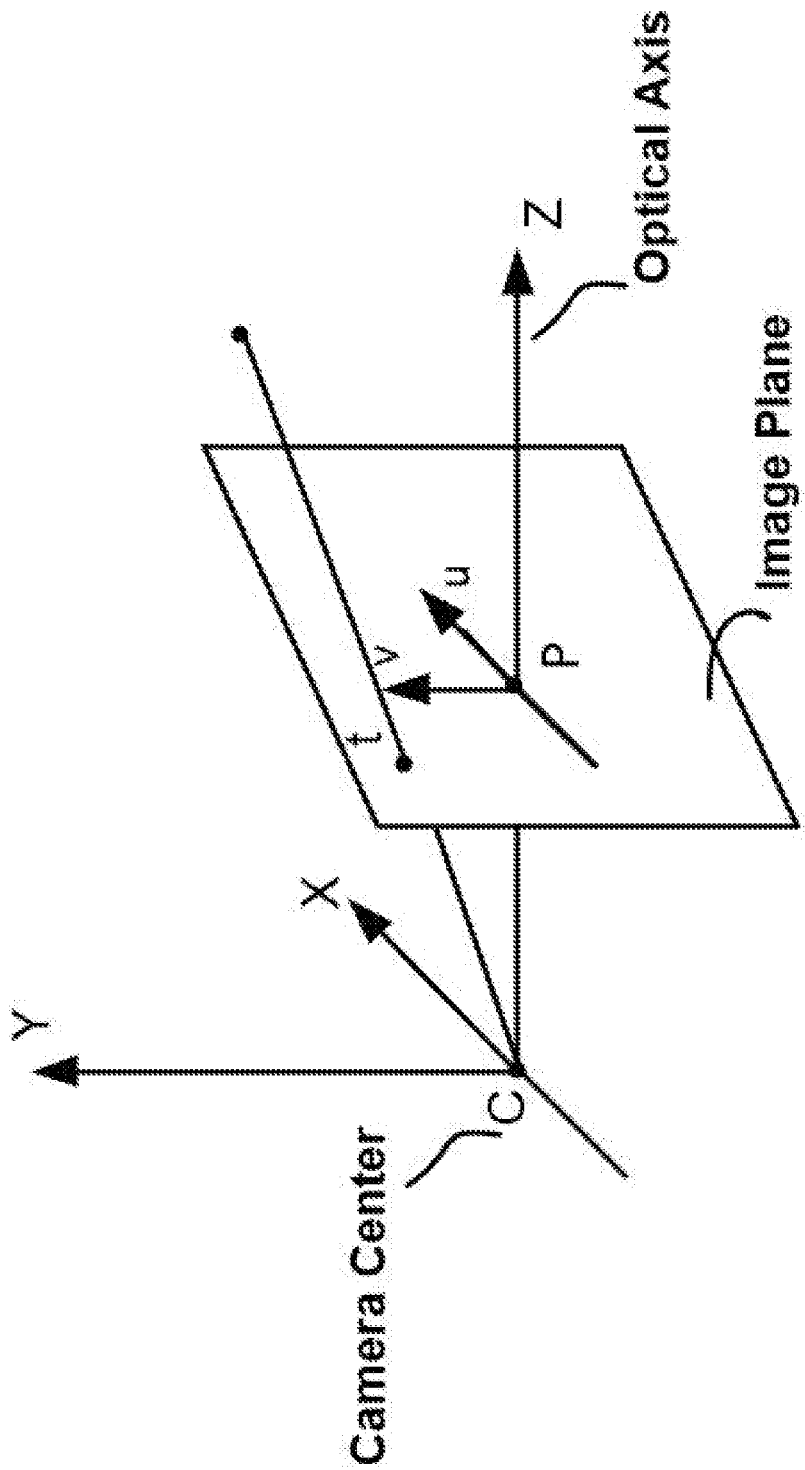
FIG. 7A is a schematic diagram showing an exemplary direction that may be determined for a target consistent with embodiments of the present disclosure.
Figure 7B:
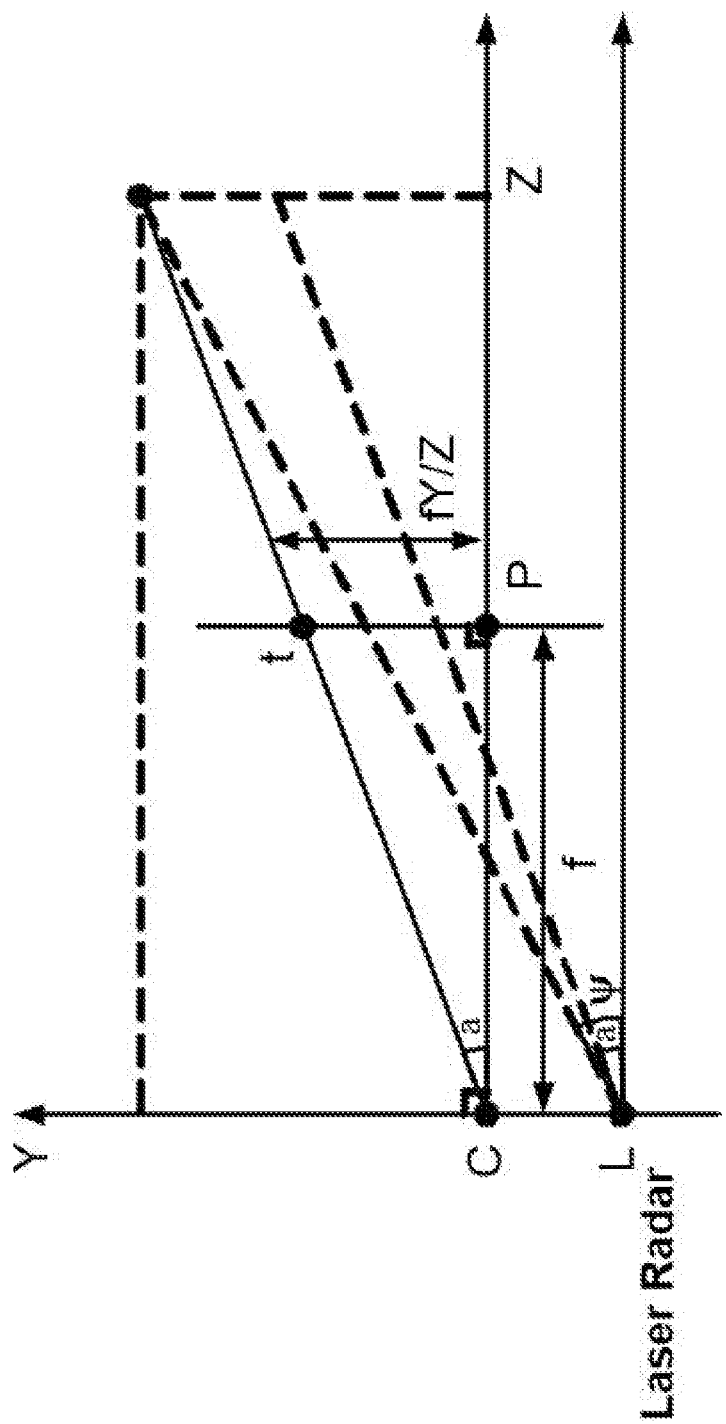
FIG. 7B is a schematic diagram showing an exemplary measurement of a distance to the target of FIG. 7A consistent with embodiments of the present disclosure.

In some embodiments, to reduce costs and increase the frame rate, the distance measurement may be performed only for a target object of interest. For example, a neural network of deep machine learning recognizes the target of interest and a region containing the target of interest (i.e., an bounding box). According to the bounding box, a center position of the target object and a direction of the center position may be calculated, as shown FIG. 7A. In FIG. 7A, a center position t of the target object is shown on an image plane having a center point P and an image coordinate system, and a direction of the center position is exhibited by connecting a center C of a camera (e.g., the imaging system 19) to the center position t of the target object. In FIG. 7B, assuming that the pixel position of the target center position t in the image coordinate system is (u, v), then v may be expressed in equation (6) as:

$$v = \frac{fY}{Z} \qquad (6)$$

where f is the focal length of the camera that may be obtained by calibrating the camera, and Y and Z are coordinates in the camera coordinate system (i.e., a world coordinate system). An angle α of the direction of the center position t of the target can be determined in equation (7) as:

$$\tan\alpha = \frac{v}{f} \qquad (7)$$

A distance measurement device, such as a laser radar as shown in FIG. 7B, is used to measure distances to the target within a range of the center position direction. The measurement device may be in a very close proximity of the camera, such that, the laser radar can measure a distance to the target of interest by scanning a certain range based on the angle α of the center position direction, for example, within an angle range of ψ as shown in FIG. 7B. The target focusing module 62 may be configured to control a focus control mechanism/module in the imaging system 19. The focus control mechanism may be a built-in mechanism in the imaging system 10, or may be any focus control mechanism that is known to those skilled in the art. After a distance to the target object is determined, the focus control mechanism may be activated to automatically adjust a focal length of the imaging system 19 to achieve an accurate focus on the target of interest according to the measured distance.

Processor 54 can be operatively coupled to the communication system 20 and be configured to transmit and/or receive data from one or more external devices (e.g., terminal 32, display device 46, or other remote controller). Any suitable means of communication can be used to transfer data and information to or from controller 22, such as wired communication or wireless communication. For example, communication system 20 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication system 20 can transmit and/or receive one or more of sensing data from the sensing system 18, processing results produced by the processor 54, predetermined control data, user commands from terminal 32 or a remote controller, and the like.

The components of controller 22 can be arranged in any suitable configuration. For example, one or more of the components of the controller 22 can be located on the movable object 10, carrier 16, payload 14, terminal 32, sensing system 18, or an additional external device in communication with one or more of the above. In some embodiments, one or more processors or memory devices can be situated at different locations, such as on the movable object 10, carrier 16, payload 14, terminal 32, sensing system 18, additional external device in communication with one or more of the above, or suitable combinations thereof, such that any suitable aspect of the processing and/or memory functions performed by the system can occur at one or more of the aforementioned locations.

Figure 8:
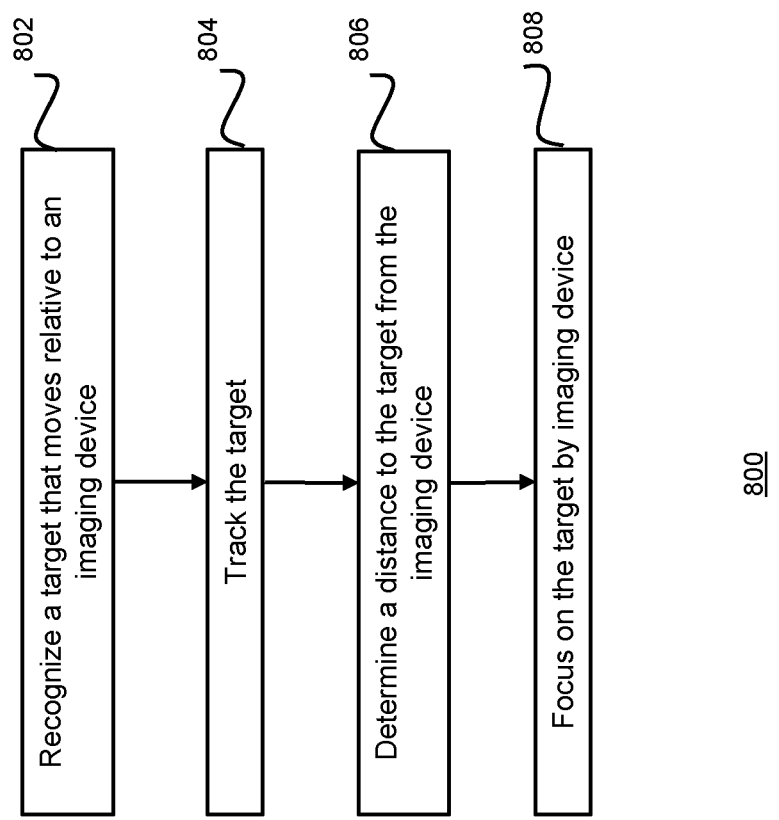
FIG. 8 is a flow chart of an exemplary method that may be performed for recognizing, tracking and autofocusing on a moving target consistent with embodiments of the present disclosure.

In accordance with the disclosed embodiments, FIG. 8 shows an exemplary method 800 that may be used for recognizing, tracking, and focusing on a target based on deep marching learning and laser radar. Although one target is described here for exemplary purpose only, the method 800 may be applied to multiple targets.

In step 802, a target object is recognized in an image. The target may be any object identified in the image, such as a dog or a car in FIG. 4A, and may move relative an imaging system. The target object may be captured in one or more images or a video by the imaging system. As described above, the target object may be identified and recognized in the one or more images or the video frames by a neural network and algorithm of deep machine learning technique. The neural network and algorithm of deep machine learning technique may be implemented in the controller 22 of the movable object 10.

In step 804, the target is tracked. As described above, tracking the target while the target is moving may be achieved by controlling propulsion devices 12 of movable object 10 to adjust the spatial disposition, velocity, and/or acceleration of the movable object 10 with respect to six degrees of freedom (e.g., three translational directions along its coordinate axes and three rotational directions about its coordinate axes) to enable movable object 10 to automatically track the target.

In step 806, a distance to the target from the imaging system 19 may be determined. Once a target of interest can be tracked, the distance to the target from the imaging system 10 may be measured, for example, by a laser radar device. The laser radar device may be embedded in or attached to the imaging system 19. Alternatively, the laser radar system may be a stand-alone device that coordinate with the imaging system for measuring a distance. The laser radar device may emit an infrared laser pulse, or any other laser pulse or beam at a desired frequency, towards the target, and receive light beams reflected off the target object. The distance to the target from the laser radar device/imaging system 19 may be calculated using a total travelling time of the light beam traveling back and forth between the target and the laser radar device, and the light speed.

In step 808, focus on the target is performed based on the determined distance. When a distance is determined for the moving target, the focal length of the imaging system may be adjusted automatically by a focus control mechanism of the imaging system 19 based on the measured distance.

The disclosed embodiments of the present disclosure provides methods and systems for identifying and recognizing multiple targets based on neural networks of deep machine learning. Multiple targets can be recognized effectively in different environments, circumstances, and scenes. The laser radar device is simple with a high reliability and accurate focus can be achieved automatically based on the distance determined by the laser radar device. Images of moving target objects can be captured using high-quality imaging devices. Further, dark objects, or objects behind glass, can also be autofocused in accordance with the disclosed embodiments. Accordingly, the disclosed embodiments of the present disclosure employ a combination of laser ranging with neural networks/deep learning for object tracking.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents

What is claimed is:

1. A system, comprising:
   an imaging device positioned at an above-ground height and configured to capture images of an environment of the imaging device;
   a controller comprising one or more processors configured to execute operations comprising:
      recognizing a target object in the captured images via a machine learning algorithm, wherein the recognizing includes determining a first bounding box around the target object;
      obtaining a first top three-dimensional coordinate point corresponding to a first top selected point of the first bounding box;
      determining a first top vector connecting a center of the imaging device and the first top three-dimensional coordinate point;
      obtaining a first bottom three-dimensional coordinate point corresponding to a first bottom selected point of the first bounding box;
      determining a first bottom vector connecting the center of the imaging device and the first bottom three-dimensional coordinate point;
      determining a first distance from the imaging device to the target object based on the first top vector, the first bottom vector, and the above-ground height;
      obtaining a first focus of the target object for the imaging device using the first determined distance;
      obtaining an image of the target object and recognizing the target object in the image using the first focus, including determining a second bounding box around the target object; and
      determining a second distance from the imaging device to the target object using the second bounding box.

2. The system of claim 1, wherein the first bottom selected point is one of a bottom left point, a bottom right point, or a bottom center point of the boundary box.

3. The system of claim 1, wherein the first top selected point is one of a top left point, a top right point or a top center point of the boundary box.

4. The system of claim 1, wherein the first bottom selected point is located directly below the first top selected point.

5. The system of claim 1, wherein determining the second distance comprises:
   determining a new above-ground height for the imaging device;
   obtaining a second top three-dimensional coordinate point corresponding to a top selected point of the second bounding box;
   determining a second top vector connecting the center of the imaging device and the second top three-dimensional coordinate point;
   obtaining a second bottom three-dimensional coordinate point corresponding to a bottom selected point of the second bounding box;
   determining a second bottom vector connecting the center of the imaging device and the second bottom three-dimensional coordinate point; and
   determining the second distance based on the second top vector, the second bottom vector, and the new above-ground height.

6. The system of claim 1, further comprising determining a third distance from the imaging device to the target object, wherein the determining of the third distance comprises:

obtaining a second focus of the target object for the imaging device using the second distance;

obtaining a new image of the target object and recognizing the target object in the new image using the second focus, including determining a third bounding box around the target object; and determining the third distance from the imaging device to the target object using the third bounding box.

7. The system of claim 6, further comprising:

determining a height difference between a height of the second bounding box, and a height of the third bounding box; and determining a distance difference between the second bounding box and the third bounding box based on the determined height difference, the second distance, and the height of the second bounding box.

8. The system of claim 7, wherein the distance difference is determined by dividing the height difference by the height of the second bounding box and multiplying by the second distance.

9. The system of claim 8, wherein the distance difference is used as feedback data for selecting a third focus for capturing an image of the target object.

10. The system of claim 1 wherein:

the first bottom three-dimensional coordinate point is determined using:

a matrix product of a rotation matrix and an inverse intrinsic matrix of a camera of the imaging system; and the first bottom selected point; and the first top three-dimensional coordinate point is determined using:

the matrix product; and the first top selected point.

11. The system of claim 1 wherein determining the first distance from the imaging device to the target object comprises:

determining a bottom projection of the first bottom vector onto a plane coincident with a ground; and determining the first distance as a product of a length of the bottom projection, the above-ground height, and an inverse of a vertical component of the first bottom three-dimensional coordinate point.

12. The system of claim 1, further comprising determining a height of the target object, wherein the determining of the height comprises:

determining a top projection of the first top vector onto a plane coincident with a ground; and determining the height as a difference between the above-ground height and a product of the first distance, a vertical component of the first top three-dimensional coordinate point, and an inverse of a length of the top projection.

13. The system of claim 1 being part of a vehicle.

14. The system of claim 13, wherein the vehicle is an unmanned aerial vehicle, and wherein the unmanned aerial vehicle comprises propulsion devices, configured to move the vehicle to maintain a desired distance between the vehicle and the target object.

15. The system of claim 14, wherein the operations further comprise:

continually determining the desired distance; and maintaining the desired distance at a target value using a feedback control.

16. The system of claim 1, wherein determining the second distance is achieved using one of a laser measuring device or an ultrasonic measurement device.

17. A method for determining a distance to a target object using a processor and an imaging device positioned at an above-ground height, wherein the imaging device is configured to capture images of an environment of the imaging device, the method comprising:

recognizing a target object in the captured images via a machine learning algorithm, wherein the recognizing includes determining a first bounding box around the target object;

obtaining a top three-dimensional coordinate point corresponding to a top selected point of the first bounding box;

determining a top vector connecting a center of the imaging device and the top three-dimensional coordinate point;

obtaining a bottom three-dimensional coordinate point corresponding to a bottom selected point of the first bounding box;

determining a bottom vector connecting the center of the imaging device and the bottom three-dimensional coordinate point;

determining a first distance from the imaging device to the target object based on the top vector, the bottom vector, and the above-ground height;

obtaining a focus of the target object for the imaging device using the first determined distance;

obtaining an image of the target object and recognizing the target object in the image using the focus, including determining a second bounding box around the target object; and determining a second distance from the imaging device to the target object using the second bounding box.

18. The method of claim 17, further comprising determining a distance difference between the first bounding box and the second bounding box, wherein the determining of the distance difference comprises:

determining a height difference between a height of the second bounding box and a height of the first bounding box; and determining the distance difference by dividing the height difference by the height of the first bounding box and multiplying by the first distance.

19. The method of claim 17, wherein the operations further comprise:

continually determining the second distance; and obtaining a new focus of the target object for the imaging device using the determined second distance.

20. A non-transitory computer-readable medium storing instructions that, when executed, cause a computer to perform a method for determining a distance to a target object using a processor and an imaging device positioned at an above-ground height, wherein the imaging device is configured to capture images of an environment of the imaging device, the method comprising:

recognizing a target object in the captured images via a machine learning algorithm, wherein the recognizing includes determining a first bounding box around the target object;

obtaining a top three-dimensional coordinate point corresponding to a top selected point of the first bounding box;

determining a top vector connecting a center of the imaging device and the top three-dimensional coordinate point;

obtaining a bottom three-dimensional coordinate point corresponding to a bottom selected point of the first bounding box;

determining a bottom vector connecting the center of the imaging device and the bottom three-dimensional coordinate point;

determining a first distance from the imaging device to the target object based on the top vector, the bottom vector, and the above-ground height;

obtaining a focus of the target object for the imaging device using the first determined distance;

obtaining an image of the target object and recognizing the target object in the image using the focus, including determining a second bounding box around the target object; and determining a second distance from the imaging device to the target object using the second bounding box.

* * * * *